(No Model.)
W. MOLLER.
AMALGAMATOR.
No. 253,084. Patented Jan. 31, 1882.
Fig. 1.
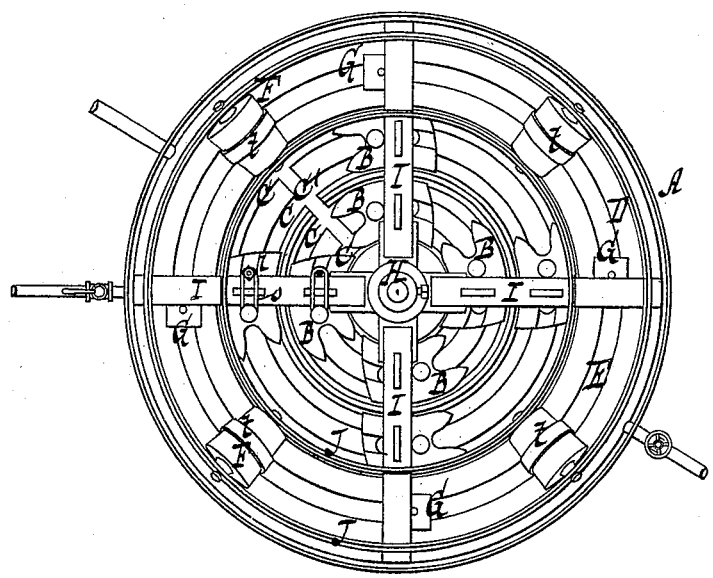
Fig. 2.
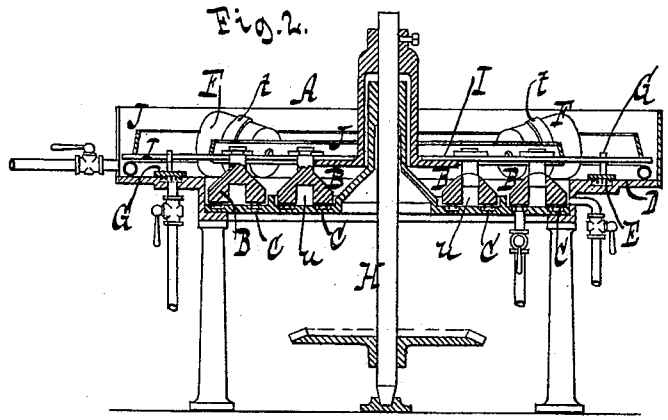
Fig. 3.
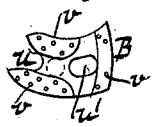
Fig. 6.
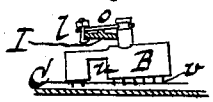
Fig. 4.
Fig. 5.
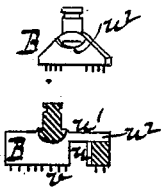
Witnesses
Otto Hufeland
William Miller
Inventor
William Moller
by Van Santvoord & Hauff
his atty's
N. PETERS, Photo-Lithographer, Washington, D. C.

United States Patent Office.

WILLIAM MOLLER, OF NEW YORK, N. Y.

AMALGAMATOR.

SPECIFICATION forming part of Letters Patent No. 253,084, dated January 31, 1882.

Application filed October 27, 1881. (No model.)

*To all whom it may concern:*

Be it known that I, WILLIAM MOLLER, a citizen of the United States, residing at New York, in the county and State of New York, have invented new and useful Improvements in Amalgamators, of which the following is a specification.

This invention relates to pan-amalgamators; and it consists in certain novel combinations of mullers, crushing-rollers, and rakes with troughs and a raised border on the bottom of the pan, as hereinafter fully set forth.

This invention is illustrated in the accompanying drawings, in which Figure 1 represents a plan or top view. Fig. 2 is a vertical cross-section. Figs. 3, 4, 5, and 6 are detail views of the mullers.

Similar letters indicate corresponding parts.

The letter A designates the pan, having a circular form; and B, the mullers, which rest on the bottom of the pan. This bottom is constructed with circular troughs or gutters C, which are concentric with the pan and with each other, and the number of which in this example is four, each pair being divided from the other by a circular concentric ridge; but in some cases a single trough also can be used.

The lower or grinding surfaces of the mullers B are provided with teeth $v$, or the like, (see Figs. 3 to 6, inclusive,) which are so arranged relatively to the concentric trough C that when the mullers are put into place the pins project into the troughs. Each of the mullers B overlaps two of the troughs C, and each is provided with a way, $u$, in its lower or grinding surface, (best seen in Fig. 3,) such way extending backward from the toe and terminating at the sides thereof, so that the longitudinal portion of this way is between the troughs, while its lateral portions traverse the troughs. The bottom of the pan is also constructed with a raised border, D, and with a circular concentric trough, E, in such border. Upon this border D travel the crushing-rollers F, which are formed respectively with a circumferential flange or offset, $t$, projecting into the trough E, the rollers being situated radially to the axis of the pan or its shaft and being preferably made conical. On the raised border D are also placed the rakes or combs G, (one or more,) with their teeth projecting into the trough E.

Through the center of the pan passes the usual vertical shaft, H, carrying radial arms I, whereby it acts on the mullers B and rakes G to propel the same in the path of the troughs, the radial arms in turn carrying rings J, which form bearings for the rollers F, so that the latter also receive motion from the shaft.

In applying the apparatus to use the troughs C E are supplied with quicksilver, ore is introduced to the pan in the proper condition, and a revolving motion is imparted to the vertical shaft H, and by the ensuing motion of the mullers their teeth $v$ are drawn through the troughs C, thus agitating the quicksilver and expelling the sand, while their ways $u$ at the same time receive the ore, and as it escapes therefrom compel it to pass across the troughs C, or the quicksilver contained therein, thus producing a very effective amalgamation. Another effect of the ways $u$ is to facilitate the movement of the mullers through the ore, and to increase this effect thereof the mullers may also be provided with a top opening, $u'$, and a top depression, $u^2$, extending backward from the opening. The flanges $t$ of the crushing-rollers catch the fine particles of mineral, and, as the rollers revolve on the raised border D, deposit such particles in the quicksilver contained in the trough E, while the teeth of the rakes G agitate the quicksilver and expel the sand from such trough, acting similar to the teeth of the mullers.

The troughs C communicate with each other by radial branches C', Fig. 1, so that they can be severally emptied through a single spout.

If it is desired to lift the teeth $v$ of the mullers out of the troughs C, this can be accomplished by connecting to the mullers, respectively, one end of a link, $o$, and connecting the other end of this link to one of the radial arms I by a hook, $l$, as clearly shown in Fig. 6.

What I claim as new, and desire to secure by Letters Patent, is—

1. The combination of the pan A, having its bottom constructed with circular concentric troughs C, and the mullers B, overlapping the two adjacent troughs and resting on the bottom of the pan, and provided with two sets of teeth, projecting respectively into the said troughs, substantially as described.

2. The combination of the pan A, having its bottom constructed with a circular concentric trough, C, and provided with a raised border, D, having a circular trough, E, the vertical shaft H, radial arms I, mullers B, having teeth v, and rakes G, both the rakes and the mullers being connected with the radial arms, substantially as described.

3. The combination of the pan A, having a raised border, D, the vertical shaft H, the radial arms I, the mullers B and rakes G, the rings J, carried by the radial arms, and the crushing-rollers journaled in the rings, substantially as described.

4. The combination, substantially as hereinbefore set forth, of the pan having its bottom constructed with a raised border and with a circular concentric trough in such border, and the crushing-rollers (one or more) traveling on the raised border and having a circumferential flange projecting into such trough, for the purpose specified.

5. The combination of the pan A, having its bottom provided with a circular concentric trough, C, and provided with a raised border, D, having a circular concentric trough, E, and the mullers B and rake G, both provided with teeth, projecting respectively into the troughs in the pan and raised border, substantially as described.

In testimony whereof I have hereunto set my hand and seal in the presence of two subscribing witnesses.

WILLIAM MOLLER. [L. S.]

Witnesses:
 W. HAUFF,
 CHAS. WAHLERS.